Oct. 6, 1959  R. L. NAFZIGER  2,907,441
BREAD PAN REVERSING APPARATUS
Filed March 18, 1954  3 Sheets-Sheet 3
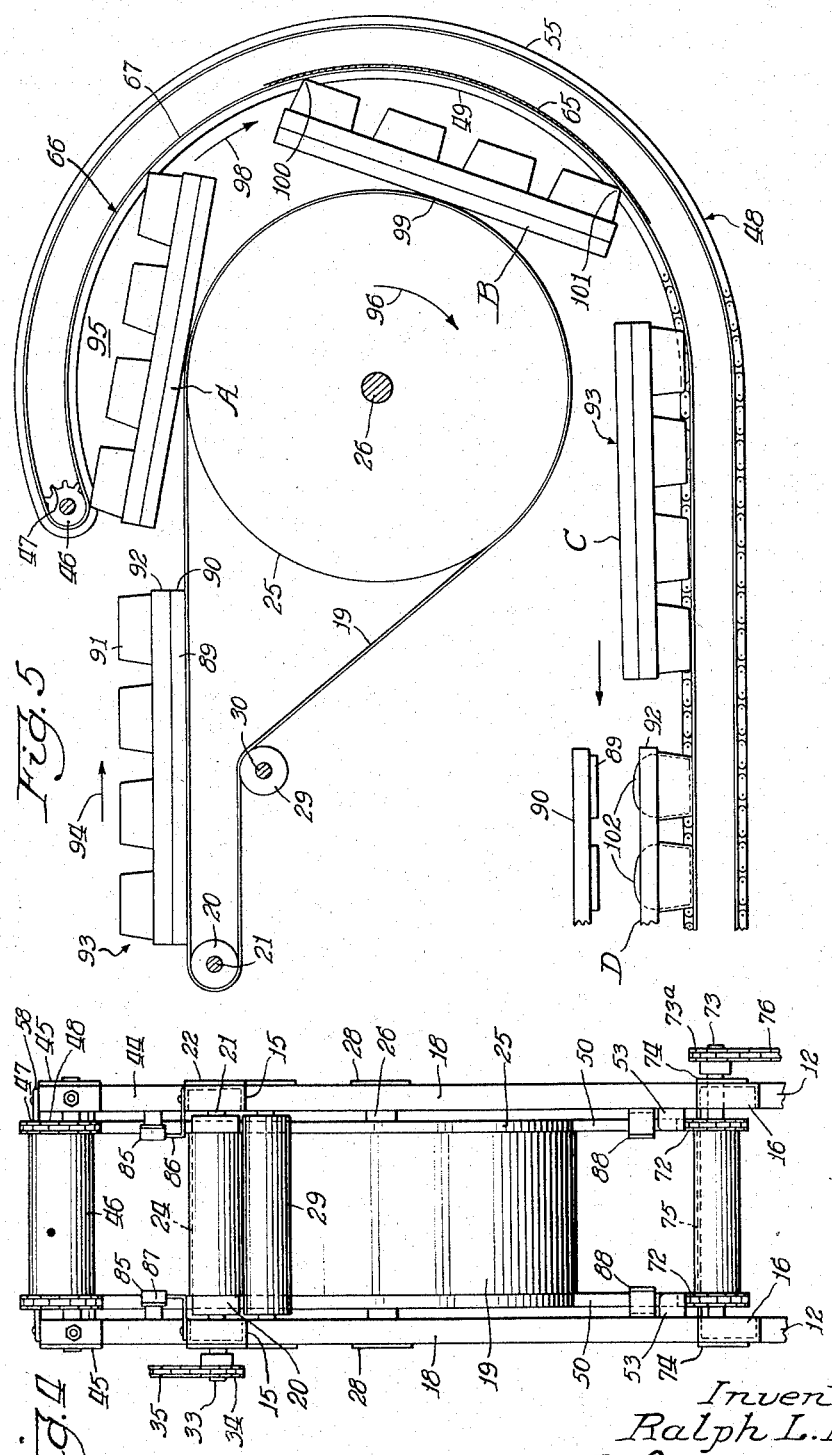
Inventor:
Ralph L. Nafziger
By: Jones, Teach + Darbo
Attys under development — patent text

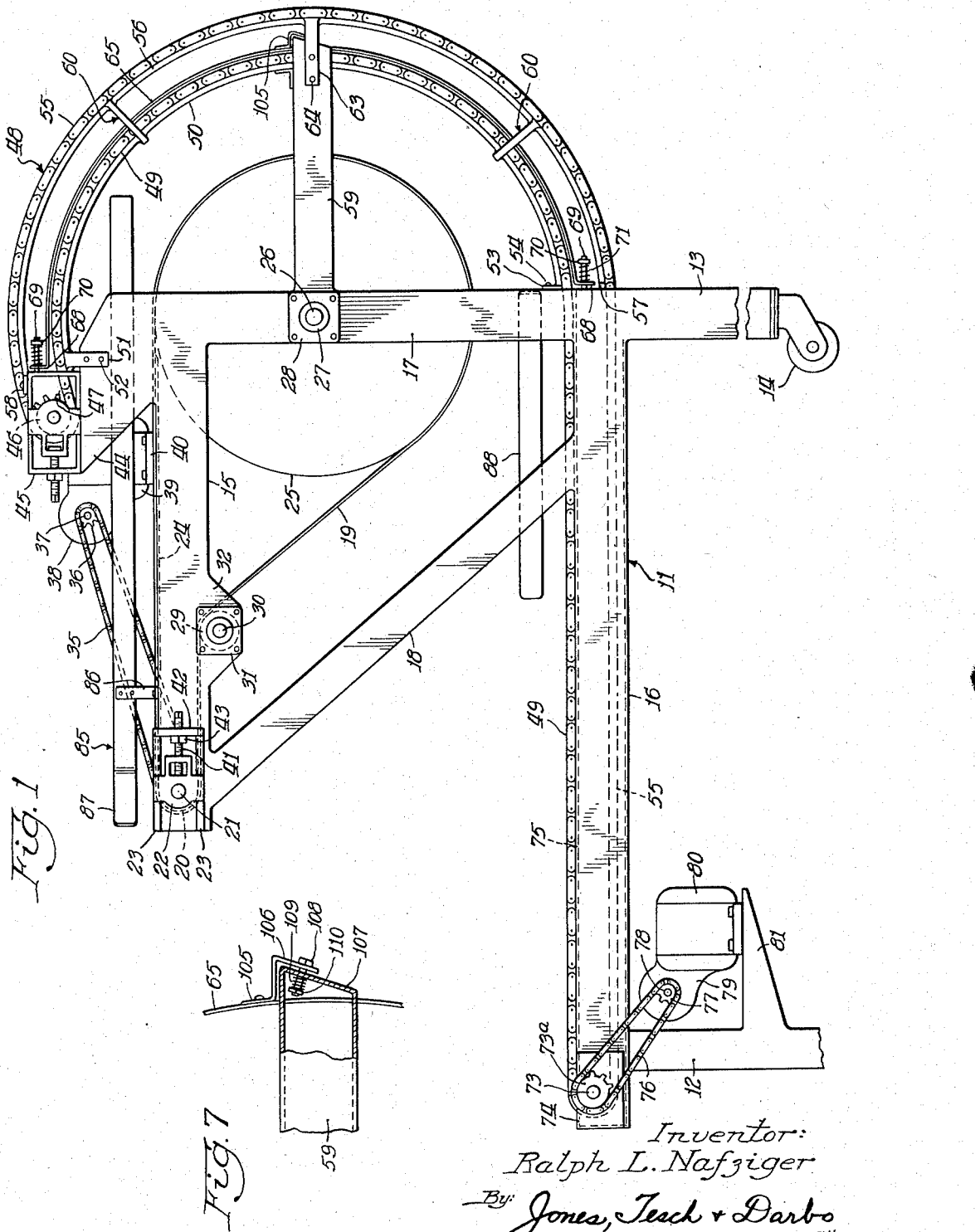

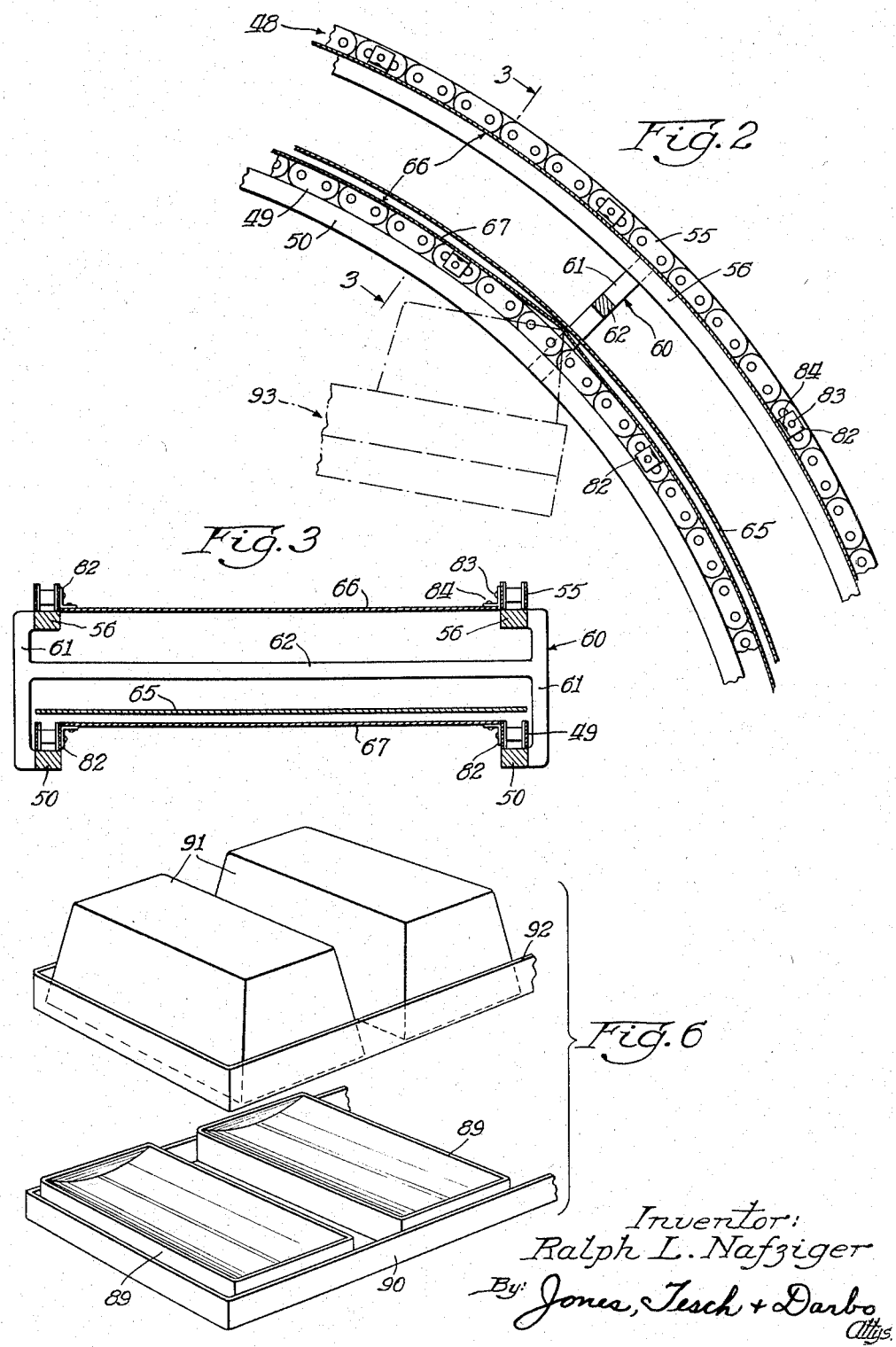

United States Patent Office 2,907,441
Patented Oct. 6, 1959

2,907,441

BREAD PAN REVERSING APPARATUS

Ralph L. Nafziger, Los Angeles, Calif.

Application March 18, 1954, Serial No. 417,056

1 Claim. (Cl. 198—33)

This invention relates to bread pan reversing apparatus more particularly for use in the production of bread and the like by the reverse baking process described in Garrett Patent 2,069,149 of November 17, 1936 in which the dough is proofed in one position and is then baked in a turned over or inverted position.

As pointed out in my prior Patents Nos. 2,495,469 and 2,583,870 dealing with this art of reverse baking, it is well-known that during the conventional step of baking known as "proofing," the dough, after having been divided and coming from the molder or other preparatory apparatus, is placed in a pan and left to "proof" in a mildly warm temperature, during which time the dough rises somewhat under the fermenting action of the dough ingredients. This conventional proofing of the dough starts the aeration of the dough, which is further completed in the later step of baking, with the concurrent formation of carbon dioxide and air cells in the dough which gives it desirable lightness and springiness.

During the proofing step, the gases of fermentation travel upwardly. It has been found that if the dough be turned over or reversed after proofing and before baking, the direction of travel of these gases is then reversed, and the cells thus produced are substantially round, and not oblong as in ordinary baking, and as a result when the baking is completed the bread has a finer, more even and more palatable texture.

There is a tendency also for the carbon dioxide and air produced by the dough fermentation to be occluded or dissolved in the moisture of the dough, a certain recognized moisture content thereof being of course necessary and desirable. This moisture in the dough, while it is standing during proofing, tends to gravitate to that portion of the dough which is nearest the bottom of the pan. It has been found that if the dough so formed and proofed be turned over after proofing and the bread baked in this reversed position from that which it occupied during proofing, the more or less wet portion of the dough formed along the bottom of the pan will now be uppermost during baking, and this wetter portion of the dough thus will receive the benefit of the higher temperature to which the uppermost part of the dough is subjected to during baking by oven. Consequently air and carbon dioxide previously dissolved or otherwise occluded in this portion of the dough will be desirably vaporized and separated from the moisture and permitted to perform their desired function of aerating the loaf and contributing to its desirable characteristics already referred to. Thus the texture of the loaf will be finer and more uniform while at the same time the usual carmelization of the sugar in the crust, and particularly the upper crust (which sugar is likely to be associated in larger quantity with the moisture in the dough) will be enhanced, thus giving the crust the desirable characteristics previously referred to. At the same time excessive formation of dextrines on the upper crust of the loaf, which frequently give the crust an undesirable glaze, will be minimized.

In my pending application Serial No. 356,988 filed May 25, 1953, now Patent No. 2,708,889, I have disclosed and claimed improved pan means for practicing the reverse baking process.

The present invention, more specifically, deals with apparatus by which the pans may be fed in a continuous stream from the proofer to the baking oven and mechanically turned over or inverted during their passage, the apparatus here disclosed embodying compact and efficient expedients for this purpose embodied in a unitary apparatus which may be intercalated with the conveyor carrying the pans from the proofer and with the conveyor carrying the pans to the ovens, so that the progress of the pans may be continuous and automatic, including the inversion step, thereby minimizing labor and expediting production on a commercial scale.

The foregoing and other objects and advantages will be apparent from the following description taken together with the accompanying drawings of an illustrative embodiment of the present invention, and in which drawings—

Figure 1 is a side elevational view of bread pan reversing apparatus following the present invention;

Figure 2 is an enlarged segmental view of a portion of the arcuate belt and framework therefor shown in Fig. 1, showing, somewhat diagrammatically, a bread pan in contact therewith;

Figure 3 is a section section taken on line 3—3 of Fig. 2;

Figure 4 is an end view of the apparatus shown in Fig. 1, taken from the left-hand side of Fig. 1;

Figure 5 is a somewhat diagrammatic view of the apparatus of Fig. 1 showing a series of bread pan gangs traveling therethrough;

Figure 6 is a composite separated view of pan and trays for the dough, making up one of the gangs shown in Fig. 5; and Figure 7 is a detail view of parts shown in Fig. 1.

Referring in detail to the illustrative construction shown in the drawings, the apparatus carriage 11 has two front legs 12 and two rear legs 13 which desirably terminate in casters 14 so that the carriage is mobile. The carriage 11 includes two horizontal conveyor beds 15 and 16 spaced vertically of each other by uprights 17 which support the upper bed 15 reinforced by oblique braces 18. It will be understood that as shown in Fig. 4 the parts last mentioned are arranged in pairs, the members of each pair being laterally spaced apart to provide a housing support for conveyor belts presently more particularly described. The members 15 provide a pair of bed runners for the upper conveyor belt and the members 16 a pair of bed runners for the lower conveyor belt, each of channel form.

The upper conveyor belt 19, leading in this instance into the apparatus, passes continuously around a conveyor roller 20 mounted on a spindle 21 that is journaled in takeup plates 22 slideable in tracks 23 affixed on the outer faces of the bed runners 15. The upper run of the conveyor belt 19 then passes into the apparatus over a flat plate 24 suitably supported by the bed runners 15 and onto a large drum 25 having an axle 26 that is journaled in a bearing 27 carried by bearing plates 28 secured medially of the uprights 17 of the carriage respectively. From thence the conveyor belt 19 passes rearwardly over an idler roller 29 journaled as at 30 in plates 31 affixed on downward projections 32 of the upper bed runners 15 respectively.

The spindle 21 is extended laterally of the apparatus as at 33 to have pinned thereon at one end a sprocket 34 over the teeth of which is trained at that end a continuous drive-chain 35 that at its other end is trained over a sprocket 36 pinned on the driven shaft 37 of a speed-reduction mechanism 38 of an electric motor 39, the latter being lodged on and suitably secured to a platform 40 bolted to one of the upper bed runners 15.

The idler roller 29 exerts some tension on the conveyor belt 19 as well as assisting in tracking the belt, and further tension as desired may be applied by a turnscrew arrangement comprising a threaded rod 41 rotatable in the takeup plate 22 and in a flange 42 of the takeup track 23 while having threaded engagement with one of these parts so as to move them toward or away from each other upon rotation of the rod. A nut 43 fixes the desired adjustment.

Extending upwardly of the apparatus in the region of the upright 17 and above the conveyor belt 19 are a pair of extension plates 44 that mount, by means of a takeup device 45 similar to that described with reference to the belt 19, a conveyor roller 46 which has fixed on each end a sprocket 47 with the teeth of which respectively are meshed the upper terminus of a pair of endless chains 48. Each of the endless conveyor chains 48 has an inner run 49 that travels downwardly and arcuately from the conveyor roller 46 over a track or guide bar 50 that is supported arcuately at its upper end by a lug 51 riveted as at 52 to the frame extension 44 and at its lower end by a lug 53 that is riveted as at 54 to the upright 17 in the vicinity of the lower bed runner 16. Similarly the outer or return run 55 of the conveyor chain 48 travels upwardly and arcuately over a track or guide bar 56 that is concentric with the guide bar 50 but of somewhat larger radius, the guide bars 56 being secured at their lower ends as at 57 to the upright 17 and at their upper end as at 58 to the takeup device 45. Medially of the arc of the guide bars 50 and 56 they are further supported by struts 59 extending laterally from the upright 17 and here shown integral with the journal plates 28 for the axle 26 of the drum 25, on the upright 17. Spacing members 60 for the guide bars 50 and 56, as best seen in Figure 3, have radial components 61 that space the guide bars apart radially and transverse components 62 that space them apart laterally. It will be noted that the runs of the conveyor chain 48 travel in contact with the guide bars 50 and 56 respectively on the outer sides of the guide bars, that is away from the center of the curvature in each case so as to maintain the conveyor chain in a curved formation. Between the spacers 60 the struts 59 carry finger extensions 63 riveted thereto as at 64 to serve a purpose similar to the spacers 60 with respect to the guide bars.

Radially outward of the arcuate guide bars 50 and between the guide bars 50 and 56 is a spring presser plate 65 that conforms to the arcuation of the guide bars 50 and 56 and is spring mounted for cooperation with the continuous canvas belt 66 (Figs. 2 and 3) that is secured at close intervals to and travels with the conveyor chain 48, and more particularly for cooperation with the inner run 67 of this belt. The presser plate 65 is flanged outwardly at each end as at 68 and these flanges are perforated to pass therethrough bolts 69 having nuts 70 screwed thereon spaced from the flanges 68. Between the nuts and the flanges on each bolt 69 is a compression coil spring 71. Thus the presser plate 65 is spring pressed toward the inner run 49 of the conveyor chain 48, for a purpose later pointed out.

At the lower terminus of the endless conveyor chain 48, the chains 49 pass over sprockets 72 respectively (Fig. 4) that are keyed to an arbor 73 that is journaled in plates 74 suitably secured on the outer faces of the channel runners 16 for the lower bed of the apparatus. These channel runners also support a bed plate 75 (Fig. 4) over which travels the inner run 67 of the canvas conveyor belt 66, the belt being here supported by the plate 75. The bed plates 24 and 75 serve to hold the side members of the apparatus in fixed spaced relation.

The arbor 73 is extended at one end and there carries a sprocket 73a that meshes with an endless drive chain 76 that is also entrained over a sprocket 77 pinned on the output shaft 78 of a speed-reduction device 79 driven by the electric motor 80 mounted on a shelf 81 carried by the forward legs 12 of the apparatus. The motor 80 thus drives the endless chains 48, and the canvas belt 66 is secured to these chains at each side of the belt, to be moved thereby, by angle clips 82 riveted to the chains and belt as at 83 and 84 respectively (Fig. 3).

The upper, or entrance end of the apparatus in this instance, has a pair of guide arms 85 one at and overhanging each side of the conveyor belt 19, suitably secured to the upper extension plates 44 at one end and to posts 86 respectively adjacent their other ends. The guide arms 85 are desirably somewhat outwardly flared as at 87 at their entrance end. Similarly, adjacent the lower bed of the apparatus, there are a pair of guide arms 88 one at and overhanging each side of the conveyor belt 66 and suitably secured to the upright 17 and oblique brace 18.

As described in my co-pending application Serial No. 356,988 hereinabove referred to, a plurality of trays 89 are held together by a band frame 90 each to receive a portion of dough and to have super-imposed thereon an inverted bread pan 91, the bread pans 91 being similarly held together by a band frame 92. In this instance there are four such trays and pans making up a pan gang 93 (Figs. 5 and 6). After a portion of dough is placed in the tray 89 and the pan 91 inverted and superimposed thereon, the pan gang 93 goes through the proofer (not here shown) during which time the dough rises to fill the inverted pan 91, and it then becomes desirable to turn over or reverse the pan gang for the next step which is that of baking, and it is to this reversing operation that the present invention is directed.

Adverting to Fig. 5, it may be understood that the upper conveyor bed of the present apparatus is located adjacent the discharge end of any suitable conveyor mechanism delivering the pan gangs with the proofed dough therein from the proofer, and that a pan gang 93 has passed onto the conveyor belt 19 of the present apparatus as shown in the initial position of its movements in the present apparatus shown in Fig. 5. The pan gang will then travel in the direction of the arrow 94 on the conveyor belt 19. As it so travels, the trays 89 and pans 91 extend transversely of the belt, so that the length of a gang along the belt is substantially greater than the transverse width thereof by reason of there being four pairs of trays and pans in a gang. At this time the band frames 90 and 92 are in abutment and registry, the frame band 90 being lowermost, and the frame band 92 uppermost. Guide arms 85 center and guide the pans.

As the pan gang continues its travel into the apparatus on the conveyor belt 19, it enters the arcuate space 95 between the conveyor belt 19 and the conveyor belt 66 and contacts both these belts, the contact of the pan gang being with the inner run 67 of the conveyor belt 66, as in the position A of the gang, the inverted pans of the gang being here uppermost. It will be noted that the longer dimension of the pan gang is in the direction of its travel. By reason of rotation of the drum 25 in the direction of the arrow 96 and travel of the inner run 67 of the conveyor belt 66 downwardly in the direction of the arrow 98, the pan gang passing therebetween is carried downwardly to the position B thereof, where reversal or inversion of the pan gang begins to take place. In this operation a certain degree of pressure must be maintained between the band frame 90 and band frame 92 so that the trays and pans will not separate, and, at the same time, this pressure must not be so great as to prevent ready passage of the pan gang through the arcuate space 95 between the conveyor belts. A desired amount of pressure is maintained by the presser plate 65. The pan gang is supported at three points as it passes through the arcuate space 95, these points being 99 on the drum 25 and 100 and 101 on the inner run 67 of the belt 66, the angle which the points 100 and 101 make with the axis of rotation of the drum 25 constituting a sector almost as large as the arc of the conveyor 66 between the horizontal plates 24 and 75. The points 100 and 101 travel in sliding contact with the presser plate 65 which backs up the belt run 67, and the plate 65, by reason of its spring mounting, yields to permit passage of the pan gang through the space 95 while at the same time maintaining a pressure between the tray frame 90 and the pan frame 92 holding the frames together and controlling the reversing action. It will be understood that the points 99, 100 and 101 are not merely points but have a linear dimension transversely of the pan gang and the apparatus. The arcuate conveyor belt 66 is sufficiently slack so that it can yield to permit tension to be maintained on the pan gang by the presser plate 65.

As the pan gang 93 continues its progress downwardly of the apparatus, it reaches the position shown at C in which it is completely inverted or reversed, with now the pans 91 lowermost and the trays 89 uppermost. Its direction of travel has also been reversed, but on a lower horizontal level. Finally, as it reaches the position D, the tray frame 90 with its trays 89 may be lifted off the pan, at which time the risen dough 102 may be seen in the pan and ready to be conveyed to the oven for baking.

The strut arms 59 may provide additional resilient supports for the presser plate 65. As best shown in Fig. 7, the plate 65 carries an angle 105 which has an angular extension 106 that laps the end face 107 of the hollow strut which is perforated to pass therethrough the headed bolt 108 that carries a compression coil spring 109 between the strut face 107 and the nut 110 on the bolt. The presser plate 65 may be moved away from the belt run 67 when the springs 109 are compressed like the springs 71.

By reason of the yieldable presser or tension plate 65 and the fact that the conveyor belt 66 extends without a break from the upper run of the apparatus to the lower run thereof and for a substantial distance after the pans have reversed, undesirable jarring or shaking of the dough is minimized or prevented. The guide arms 88 assist in centering the bread pans as they come off the arcuate conveyor and onto the lower horizontal conveyor.

The drum 25 is not only concentric with the center of curvature of the arcuate belt 66 but has a radius such as when spaced therefrom to provide the restricted passageway 95 therebetween.

So constructed and arranged, ready use in commercial applications may be made of the reverse baking process, with its many attendant advantages, while expediting and facilitating reversal of the pans for that purpose.

The invention is not intended to be limited to details of construction shown for purposes of illustration. Furthermore, it may not be essential in all adaptations thereof to use all features of the invention conjointly, since various combinations and sub-combinations may at times be advantageously employed. Such changes and adaptations may be made as fall within the scope of the appended claim without departing from the invention.

What is here claimed is:

Bread dough carrying pan inverting mechanism comprising a relatively large rotatable drum, a relatively small roller horizontally spaced therefrom aligned substantially with the upper periphery of the drum, a first endless belt conveyor trained over said drum and roller, a second endless belt conveyor arranged in an arc concentric with said drum spaced about the drum at its side opposite said roller, said second conveyor at its upper end having its arc continued downwardly toward a horizontal portion of the first conveyor and overhanging the first conveyor in the region thereof between said roller and said drum whereby to provide a restricted entrance opening between said first and said second conveyors, said first conveyor having an upper run extending continuously from a distance spaced horizontally from said drum to a point well within the arc of the second conveyor and about said drum back to said roller whereby to carry bread dough carrying pans toward said second conveyor and into the space between said drum and said second conveyor without jarring the dough, the second conveyor extending downwardly from the first conveyor and being continued horizontally on a lower level parallel with the first conveyor and for a distance at least as great as the space between the drum and roller whereby to further avoid jarring of the dough, said second conveyor including an arcuate presser plate providing a resilient backing for said inner run of the second conveyor for contacting the bread dough carrying pans thereat.

References Cited in the file of this patent

UNITED STATES PATENTS

| | | |
|---|---|---|
| 142,234 | Howland | Aug. 26, 1873 |
| 1,991,652 | Bean | Feb. 19, 1935 |
| 2,605,883 | Thames | Aug. 5, 1952 |
| 2,642,178 | Naylor | June 16, 1953 |